United States Patent
Lee et al.

(10) Patent No.: US 9,710,014 B2
(45) Date of Patent: Jul. 18, 2017

(54) MOBILE TERMINAL

(75) Inventors: Jang Won Lee, Seoul (KR); Chu Young Yoon, Seoul (KR)

(73) Assignee: BLUEBIRD SOFT INC. (KR)

( * ) Notice: Subject to any disclaimer, the term of this patent is extended or adjusted under 35 U.S.C. 154(b) by 827 days.

(21) Appl. No.: 13/820,138

(22) PCT Filed: Jul. 25, 2011
(Under 37 CFR 1.47)

(86) PCT No.: PCT/KR2011/005481
§ 371 (c)(1),
(2), (4) Date: Dec. 23, 2013

(87) PCT Pub. No.: WO2012/030071
PCT Pub. Date: Mar. 8, 2012

(65) Prior Publication Data
US 2014/0185234 A1    Jul. 3, 2014

(30) Foreign Application Priority Data
Sep. 2, 2010  (KR) .................. 10-2010-0085814

(51) Int. Cl.
*G06F 1/16*    (2006.01)
*H04M 1/02*    (2006.01)
(Continued)

(52) U.S. Cl.
CPC ......... *G06F 1/1626* (2013.01); *H04B 1/3888* (2013.01); *H04M 1/0249* (2013.01);
(Continued)

(58) Field of Classification Search
CPC ............ H04M 1/0249; H04M 1/0262; H04M 1/0266; H04M 1/18; H04M 1/236;
(Continued)

(56) References Cited

U.S. PATENT DOCUMENTS 4,896,370 A     1/1990  Kasparian et al.
5,155,659 A *  10/1992  Kunert .................. G06F 3/0238
                                                  220/375
(Continued)

FOREIGN PATENT DOCUMENTS

CN    101091174 A    12/2007
CN    101155202 A     4/2008
(Continued)

*Primary Examiner* — Bernard Rojas
(74) *Attorney, Agent, or Firm* — Renaissance IP Law Group LLP

(57) ABSTRACT

Disclosed is a mobile terminal. The mobile terminal of the present invention comprises: a terminal case including a front surface case and a rear surface case which are coupled together; and a trigger unit, which is provided so as to be exposed to the exterior of the terminal case for performing user input by means of a pulling movement, wherein the trigger unit further includes a trigger switch which is exposed to the exterior of the terminal case, a trigger rubber which comes into close contact with the inside of the terminal case so as to cover the trigger switch, and a trigger bracket which supports the trigger rubber by means of pressure and which is coupled to the inside of the terminal case. According to the present invention, provided are the mobile terminal and the method for manufacturing same, the mobile terminal having a superior waterproof function and which is easy to produce and assemble.

26 Claims, 12 Drawing Sheets

(51) Int. Cl.
   *H04M 1/18* (2006.01)
   *H04M 1/23* (2006.01)
   *H04B 1/3888* (2015.01)
   *H04B 1/38* (2015.01)

(52) U.S. Cl.
   CPC ....... *H04M 1/0262* (2013.01); *H04M 1/0266* (2013.01); *H04M 1/18* (2013.01); *H04M 1/23* (2013.01); *H04M 1/236* (2013.01); *H04B 2001/3894* (2013.01)

(58) Field of Classification Search
   CPC ...... H04M 1/23; G06F 1/1626; H04B 1/3888; H04B 2001/3894
   USPC .......................................... 361/679.55, 679.56
   See application file for complete search history.

(56) References Cited

U.S. PATENT DOCUMENTS

| | | | | |
|---|---|---|---|---|
| 5,200,597 | A * | 4/1993 | Eastman | G06K 7/10584 235/455 |
| 5,736,726 | A * | 4/1998 | VanHorn | G06K 7/10881 200/61.02 |
| 6,039,256 | A * | 3/2000 | Konosu | G06K 7/10881 235/462.43 |
| 6,326,571 | B1 | 12/2001 | Kitamura et al. | |
| 8,567,682 | B2 * | 10/2013 | Boyd | G06K 7/10 235/472.01 |
| 8,814,049 | B2 * | 8/2014 | Lee | G06K 7/10881 235/462.3 |
| 2003/0083107 | A1 | 5/2003 | Morishima | |
| 2003/0234291 | A1 * | 12/2003 | Wulff | G06F 3/0202 235/462.48 |
| 2004/0176048 | A1 | 9/2004 | Klinghult et al. | |
| 2006/0030214 | A1 * | 2/2006 | Katou | F16B 37/14 439/607.01 |
| 2007/0034493 | A1 | 2/2007 | Kawasaki et al. | |
| 2007/0215451 | A1 | 9/2007 | Sasloff et al. | |
| 2008/0014787 | A1 | 1/2008 | Kim et al. | |
| 2008/0081679 | A1 | 4/2008 | Kawasaki et al. | |
| 2008/0116280 | A1 * | 5/2008 | Plesko | H01H 3/38 235/462.48 |
| 2008/0124626 | A1 | 5/2008 | Murata et al. | |
| 2008/0125197 | A1 | 5/2008 | Hongo et al. | |
| 2009/0159412 | A1 | 6/2009 | Liu et al. | |
| 2009/0266697 | A1 | 10/2009 | Sugi et al. | |
| 2010/0072048 | A1 | 3/2010 | Zuo et al. | |
| 2011/0051360 | A1 | 3/2011 | Dabov et al. | |
| 2011/0075381 | A1 * | 3/2011 | Chang | H01M 2/1066 361/747 |
| 2012/0113012 | A1 * | 5/2012 | Cho | H04B 1/3888 345/169 |

FOREIGN PATENT DOCUMENTS

| | | |
|---|---|---|
| CN | 101188337 A | 5/2008 |
| CN | 101188632 A | 5/2008 |
| CN | 101471194 A | 7/2009 |
| CN | 101685716 A | 3/2010 |
| JP | H09129079 A | 5/1997 |
| JP | H11283461 A | 10/1999 |
| JP | 2003156630 A | 5/2003 |
| JP | 2004079220 A | 3/2004 |
| JP | 2005117079 A | 4/2005 |
| JP | 2007060445 A | 3/2007 |
| JP | 2007274087 A | 10/2007 |
| JP | 2008091220 A | 4/2008 |
| JP | 2008106932 A | 5/2008 |
| JP | 2008-130519 | 6/2008 |
| JP | 2009105610 A | 5/2009 |
| JP | 2010067838 A | 3/2010 |
| JP | 2010087022 A | 4/2010 |
| JP | 2010109849 A | 5/2010 |
| KR | 20010027311 A | 4/2001 |
| KR | 1020030044115 A | 6/2003 |
| KR | 20040027929 | 4/2004 |
| KR | 1020080029785 A | 4/2008 |
| KR | 1020080047255 A | 6/2008 |
| WO | 2006080794 A | 8/2006 |

\* cited by examiner

MOBILE TERMINAL

TECHNICAL FIELD

The present invention relates to a mobile terminal, and more particularly, to a mobile terminal having an easy and simple structure that is easy to manufacture and assemble and has a superior waterproof function.

BACKGROUND ART

A mobile terminal is a terminal that can be freely used while moving around without positional restrictions. A typical mobile terminal includes a mobile communication terminal such as a cellular phone; a personal digital assistant (PDA) called a personal portable terminal, etc. Accordingly, the term "mobile terminal" used herein includes all of the above-described terminals. In the following description, however, for convenience of explanation, the mobile terminal refers to a PDA.

PDA is referred to as a pocket computer, collectively called a palm-sized compact device with a calculation function and an information storing and searching function for a personal or business use, and is widely used to keep information of a schedule calendar and an address book.

In particular, an industrial PDA is widely used mainly for distribution industry and a market for the industrial PDA is gradually growing. The industrial PDA is equipped with various office functions such as a barcode scanner, a credit card reader, etc., which are not provided in a general PDA. The use of the industrial PDA makes delivery, document management, and related businesses easy and efficient. For example, in an insurance company, an insurance broker can directly process various insurance related businesses such as customer information management, customer search, schedule management, meeting schedule management, anniversaries search, fund statement processing, etc., on the spot by using the industrial PDA. Next, in a hospital, medical staffs can input or search for patient's treatment records and case history, prescriptions, images such as X-ray images, graphical materials, etc., without restrictions in time and place, by using the industrial PDA being carried. Also, for police forces' services, police forces' outside duty such as traffic control or neighborhood security is performed by using the industrial PDA so that a fine issued for a traffic offense can be instantly paid through a financial institution, which could have been paid 2-3 days after the fine was issued. As a result, the police forces' outside duty time can be remarkably reduced.

As it can be seen from the fact that the industrial PDA is used in the above-described various industrial fields, the industrial PDA needs to endure any industrial environment, not a general environment for a general PDA, beyond a certain level. In other words, unlike a general PDA, it is expected that the industrial PDA may be used in a cold storage warehouse below −10 degrees or outdoors for a long time. Also, the industrial PDA may be toughly handled by a user like a postman. Accordingly, an industrial PDA equipped with an anti-shock function, a waterproof function, and anti-heat/cold function, etc. may be competitive in the product market. As such, it is essential that the industrial PDA is manufactured tougher and harder than a general PDA and further equipped with a waterproof function to endure snow or rain.

The industrial PDA has various parts and structures into which foreign materials or moisture may intrude in manufacturing and assembling processes thereof. For example, a structure such as a keypad, a touch window, a trigger, etc. corresponding to a user input device is difficult to be equipped with a waterproof function, and even if it is possible, the structure becomes complicated so that manufacture and assembly thereof is difficult. Also, for an industrial PDA to have a waterproof function, a coupling portion of upper and lower cases and a battery pack require a waterproof process. Thus, in the case of an industrial PDA, development of a product having a structure that is easy to manufacture and assemble and has a superior waterproof function is needed.

DETAILED DESCRIPTION OF THE INVENTION

Technical Problem

The present invention provides a mobile terminal that is easy to manufacture and assemble and has a superior waterproof function.

Technical Solution

According to an aspect of the present invention, there is provided a mobile terminal including a terminal case including a front surface case and a rear surface case which are coupled together, and a trigger unit, which is provided so as to be exposed to the exterior of the terminal case for performing user input by means of a pulling movement, wherein the trigger unit includes a trigger switch which is exposed to the exterior of the terminal case, a trigger rubber which comes into close contact with the inside of the terminal case so as to cover the trigger switch, and a trigger bracket which supports the trigger rubber by means of pressure and which is coupled to the inside of the terminal case.

The trigger switch may be outwardly exposed through a trigger through-hole of the rear surface case.

The trigger switch may include a pulling portion partially outwardly exposed through the terminal case and performing a pulling movement by a user, a pivot portion connected to the pulling portion and pivotably coupled to the terminal case, and a pressing portion protruding from the pulling portion and pressing a trigger printed circuit board (PCB) during the pulling movement of the pulling portion.

The trigger rubber may be formed of an elastic material.

The trigger rubber may include a rubber main body portion accommodated in an inner surface of the trigger bracket, a contact portion coupled to the trigger switch and contacting a trigger printed circuit board (PCB) by the pulling movement of the trigger switch, and an inclined portion connecting the rubber main body portion and the contact portion such that the contact portion is elastically biased in a direction opposite to a direction in which the contact portion is pressed when the contact portion is pressed.

A trigger protrusion line having a closed loop shape may be formed along an edge of the rubber main body portion and may be coupled to a trigger groove portion formed in an inner surface of the rear surface case.

An end portion of the trigger protrusion line may be provided in a polygonal or circular shape and a part of the end portion of the trigger protrusion line may be formed to be larger than the width of the trigger groove portion.

A carbon contact may be provided at an end portion of the contact portion.

The inclined portion may have a dome shape in connecting the rubber main body portion and the contact portion.

The trigger bracket may include a bracket main body portion closely pressing and supporting the trigger rubber, a plurality of screw coupling portions provided at an edge of the bracket main body portion and coupled to the inside of the terminal case, and a contact through-hole portion formed by penetrating the bracket main body portion such that the trigger rubber contacts a trigger printed circuit board (PCB).

The mobile terminal may further includes a battery pack for supplying electric power to the mobile terminal, and a cushion interposed between the battery pack and the rear surface case and hermetically maintaining a coupling portion of the battery pack and the rear surface case.

The battery pack may include an upper case having a releasable coupling portion that enables a release of the battery pack from the rear case, and a lower case coupled to the upper case with a part accommodation space between the lower case and the upper case and having a sealing line formed on a lower surface of the lower case and pressing the cushion.

A battery groove portion having a closed loop shape may be formed along an edge of a portion of the lower case to be coupled with the upper case and the cross-section of the battery groove portion may have a "U" shape.

A battery protrusion portion may be provided in the upper case corresponding to the battery groove portion and a welding thread may be formed in an end portion of the battery protrusion portion.

The upper case and the lower case may be forcibly insertion coupled with each other and the welding thread may couple the upper case and the lower case to each other by an ultrasonic welding method.

The cushion may be formed of polyolefin foam.

The mobile terminal may further include a keypad silicon of a flexible material coupled to a plurality of key buttons and accommodated in a keypad accommodation portion of the front surface case, and a keypad bracket coupled to the front surface case with the keypad silicon interposed between the keypad bracket and the front surface case and closely pressing and supporting the keypad silicon.

A keypad groove portion having a closed loop shape may be formed along an edge of the keypad accommodation portion and a keypad protrusion portion having a closed loop shape may be formed along an edge of the keypad silicon corresponding to the keypad groove portion.

An end portion of the keypad protrusion portion may have a polygonal or circular shape and a part of the end portion of the keypad protrusion portion may be formed to be larger than the width of the keypad groove portion.

The keypad silicon may include a plurality of button coupling portions to which the plurality of key buttons are coupled and the keypad silicon may be integrally molded so as to have no crack in a surface thereof.

The mobile terminal may further include a sealing rubber that is formed of a flexible material and interposed between the front surface case and the rear surface case, wherein a case groove portion having a closed loop shape, to which the sealing rubber is coupled, is provided along an edge of any one of the front surface case and the rear surface case, and a case protrusion portion for pressing the sealing rubber is provided on any one of the front surface case and the rear surface case.

A protrusion thread having a closed loop shape may be formed corresponding to the case groove portion at one end portion of the sealing rubber in a direction to be coupled to the case groove portion.

The mobile terminal may further include a touch window covering an image display portion of the front surface case and capable of touch input, and a double-sided tape attached along an edge of the image display portion and coupling the touch window to the front surface case.

A through-hole, through which a flexible printed circuit board (FPCB) that connects the touch window and a main printed circuit board (PCB) passes, may be formed at a portion of the edge of the image display portion, and a sealing member may be provided in the through-hole.

A plurality of screw insertion holes that are screw coupled to the front surface case may be provided in the rear surface case. The mobile terminal may further include a screw cap that is formed of a flexible material, is inserted into each of the plurality of screw insertion holes, and seals the plurality of screw insertion holes.

The screw cap may include a cap main body portion having a cylindrical column shape, a diameter of cross-section of which is smaller than the diameter of the screw insertion hole, a cap header portion provided at an end portion opposite to a direction in which the cap main body portion is inserted into the screw insertion hole and forcibly inserted into the screw insertion hole, and at least one cap O-ring portion having an O-ring shape, which protrudes in a radial direction of the cap main body portion and is forcibly inserted into the screw insertion hole.

Advantageous Effects

According to the present invention, a mobile terminal that is easy to manufacture and assemble and has a superior waterproof function is provided.

BEST MODE

Figure 1:
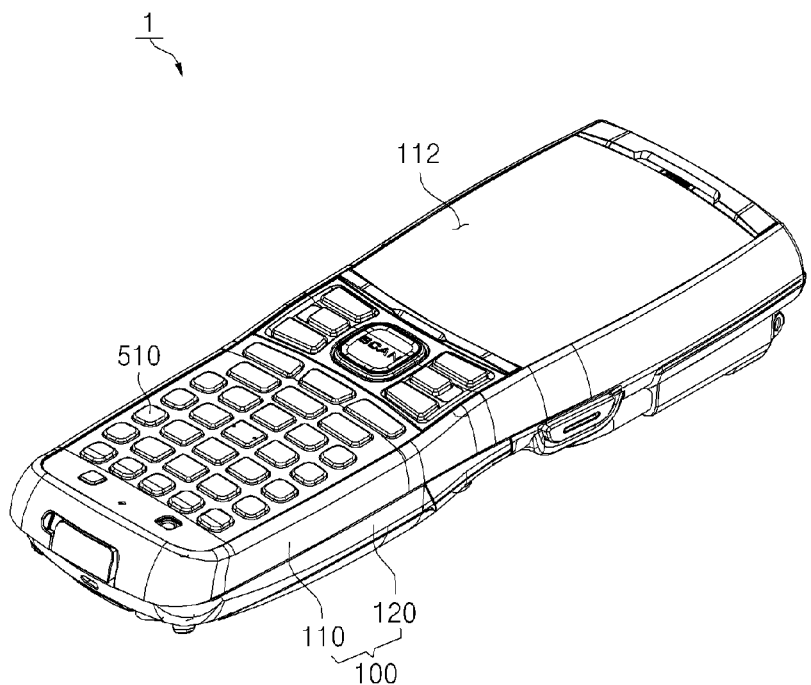
FIG. 1 is a perspective view of a mobile terminal according to an embodiment of the present invention.

The attached drawings for illustrating exemplary embodiments of the present invention are referred to in order to gain a sufficient understanding of the present invention, the merits thereof, and the objectives accomplished by the implementation of the present invention.

Hereinafter, the present invention will be described in detail by explaining exemplary embodiments of the invention with reference to the attached drawings. Like reference numerals in the drawings denote like elements.

Figure 2:
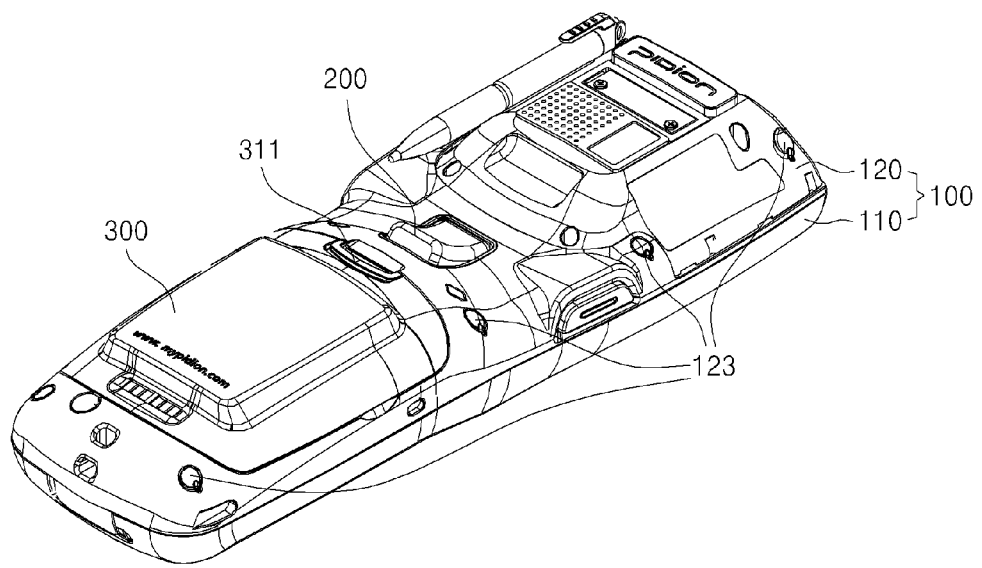
FIG. 2 is a perspective view of a rear surface of FIG. 1.
Figure 3:
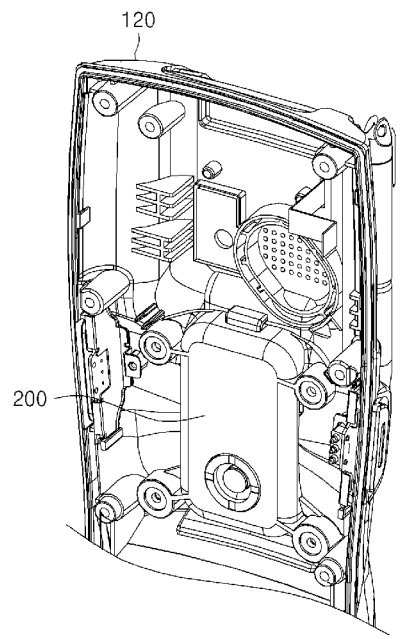
FIG. 3 is a perspective view of a trigger unit.
Figure 4:
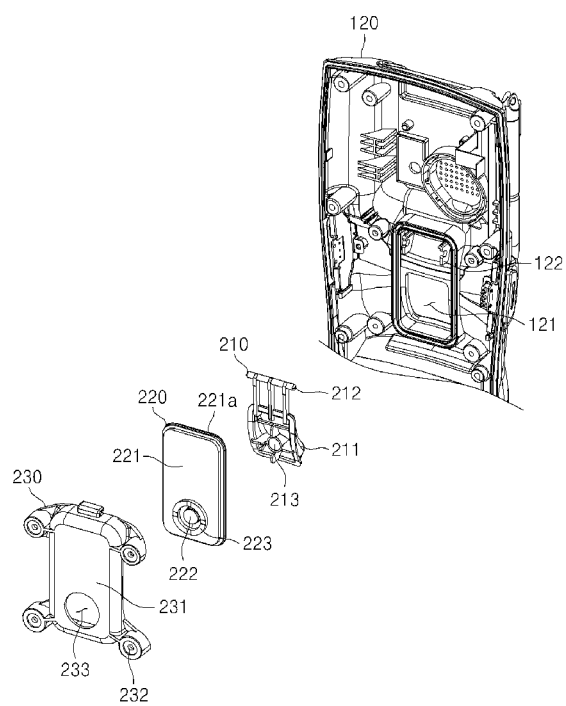
FIG. 4 is an exploded perspective view of the trigger unit of FIG. 3.
Figure 5:
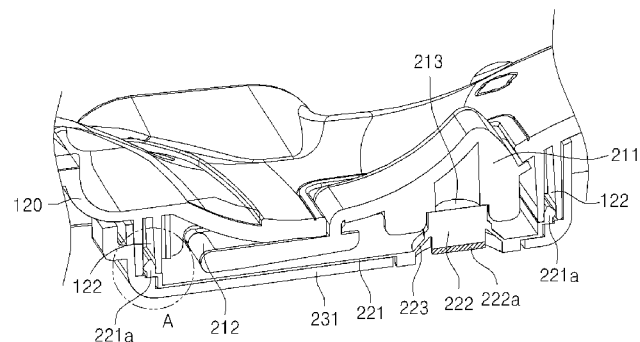
FIG. 5 is a cross-sectional perspective view of the trigger unit of FIG. 3.
Figure 6:
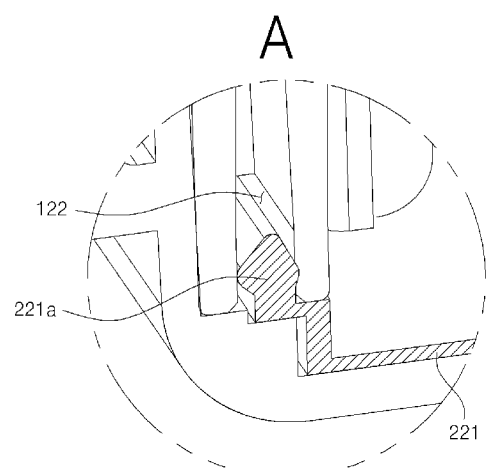
FIG. 6 is an enlarged cross-sectional view of a portion A of FIG. 5.
Figure 7:
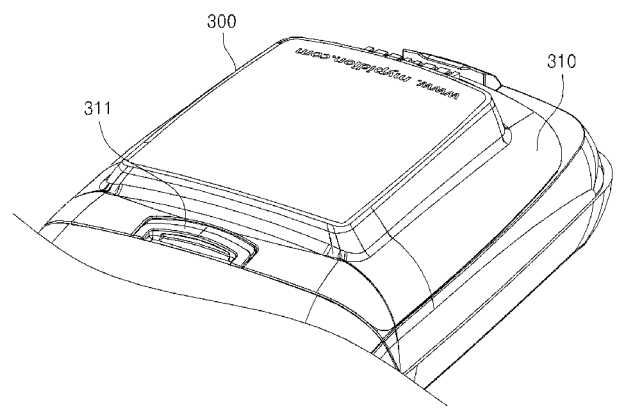
FIG. 7 is a perspective view of a battery pack.
Figure 8:
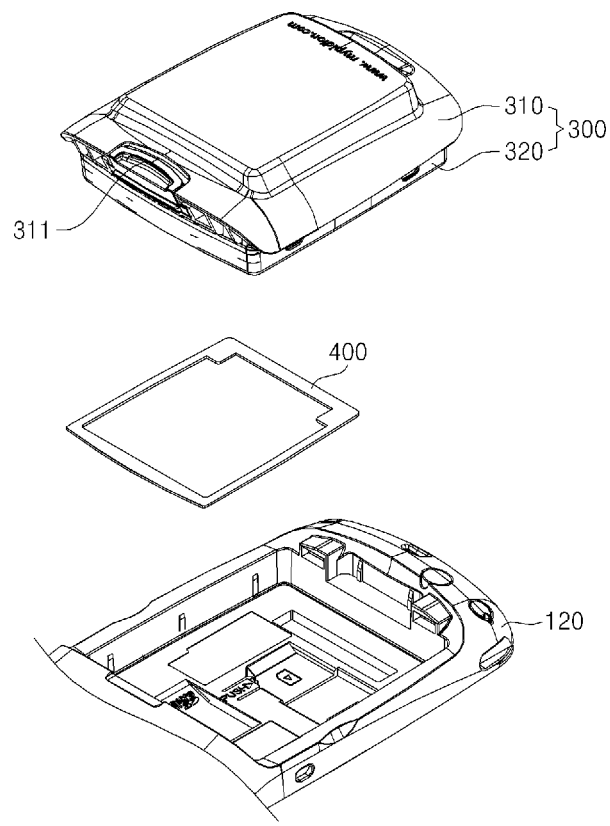
FIG. 8 is an exploded perspective view of the battery pack of FIG. 7.
Figure 9:
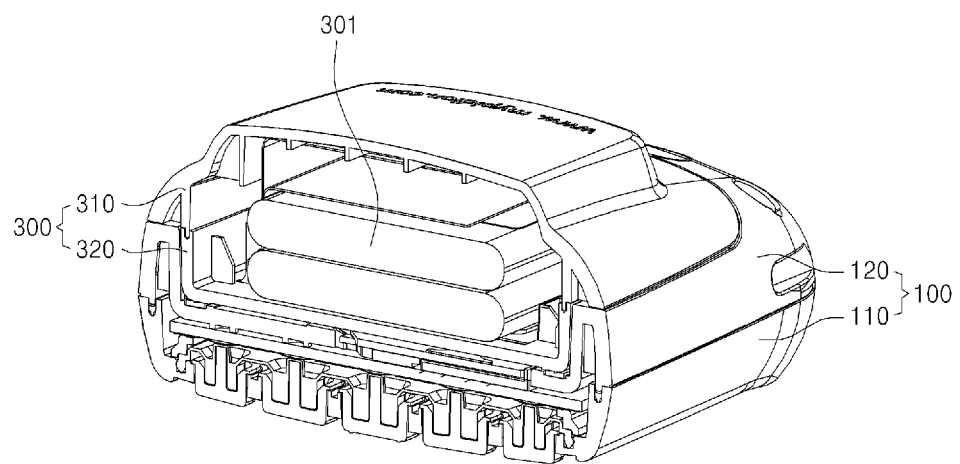
FIG. 9 is a cross-sectional perspective view of the battery pack of FIG. 7.
Figure 10:
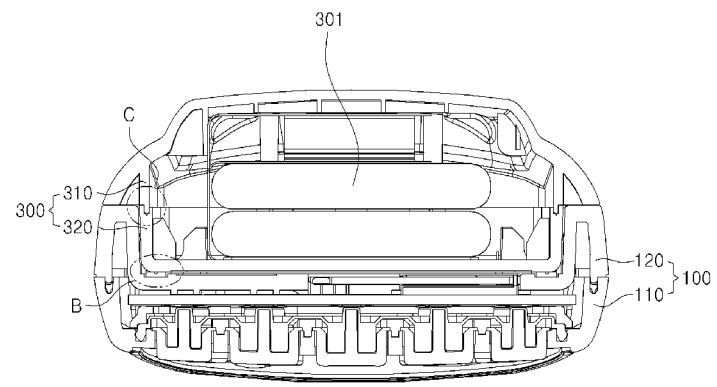
FIG. 10 is a front view of FIG. 9.
Figure 11:
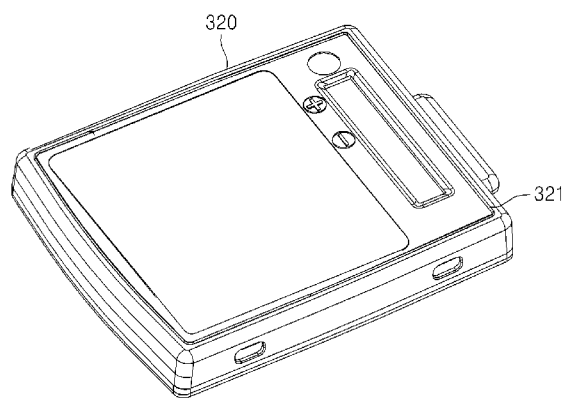
FIG. 11 is a perspective view of a battery pack lower case.
Figure 12:
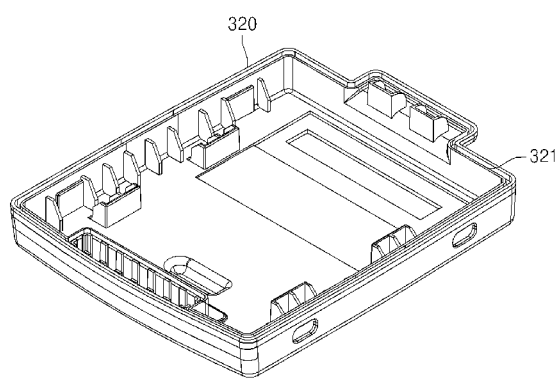
FIG. 12 is a perspective view of the battery pack lower case of FIG. 11, viewed from the opposite direction.
Figure 13:
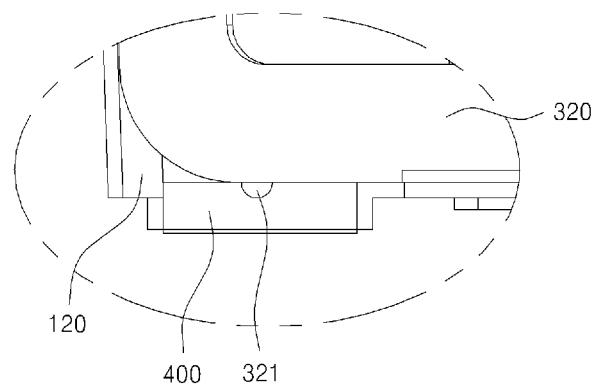
FIG. 13 is an enlarged cross-sectional view of a portion B of FIG. 10.
Figure 14:
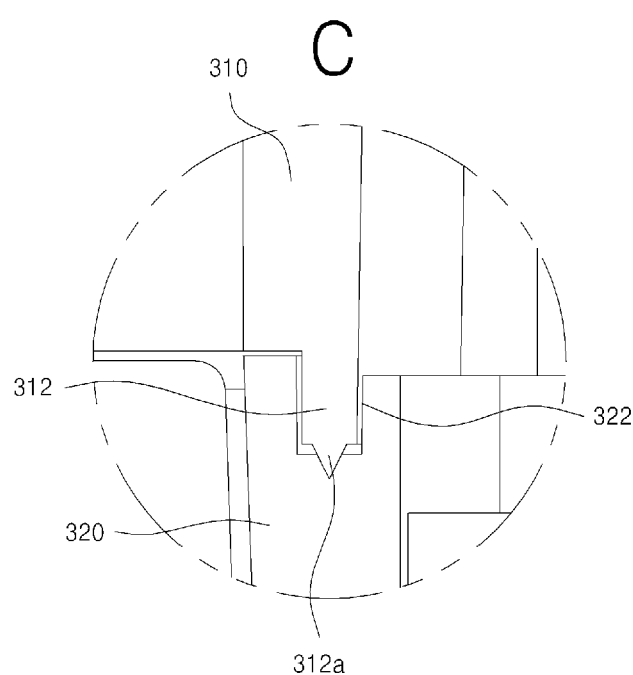
FIG. 14 is an enlarged cross-sectional view of a portion C of FIG. 10.
Figure 15:
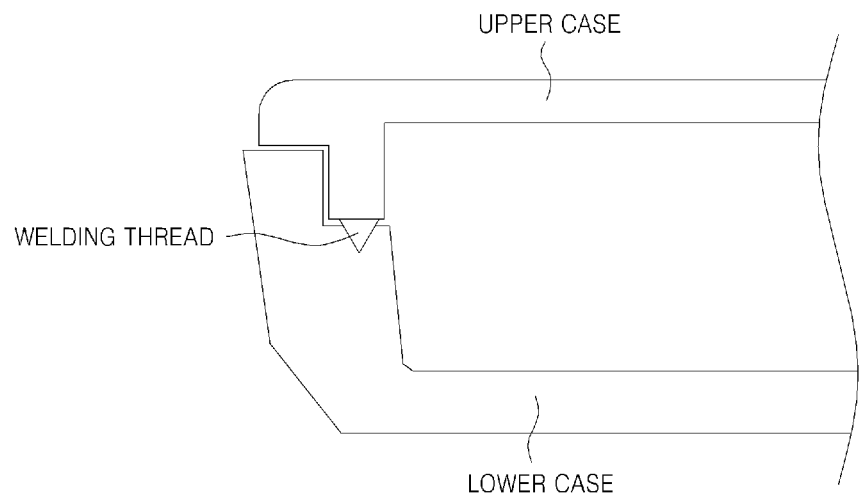
FIG. 15 is a cross-sectional view of a conventional battery pack structure.
Figure 16:
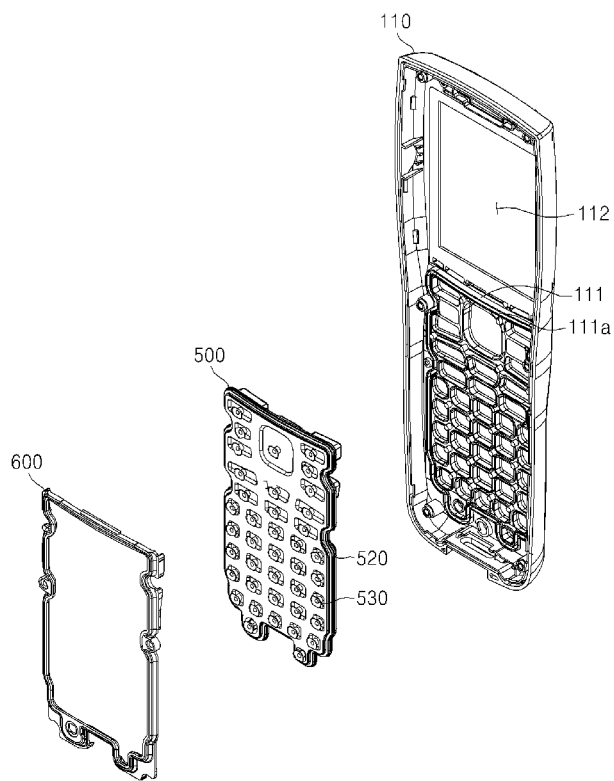
FIG. 16 is an exploded perspective view of a keypad structure.
Figure 17:
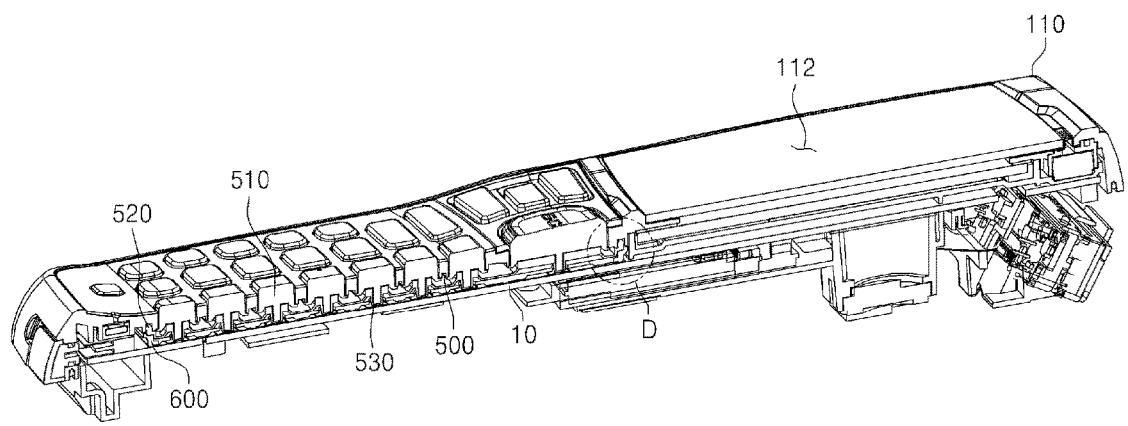
FIG. 17 is a cross-sectional perspective view of the keypad structure of FIG. 16.
Figure 18:
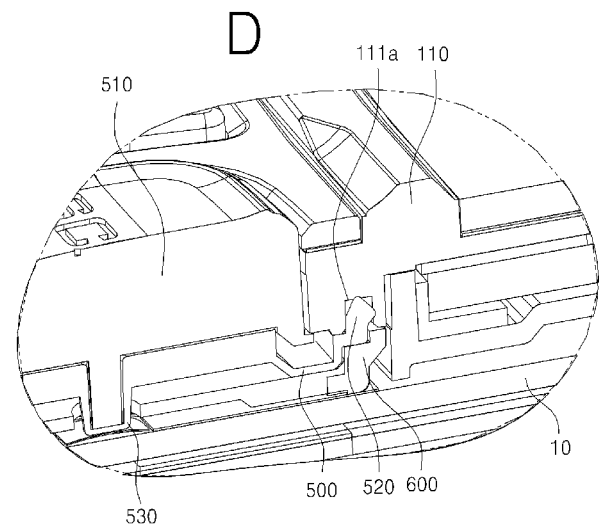
FIG. 18 is an enlarged cross-sectional view of a portion D of FIG. 17.
Figure 19:
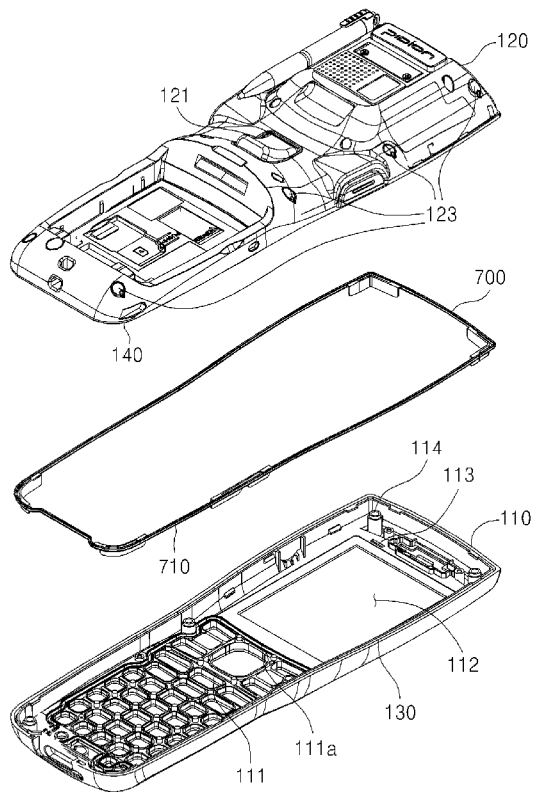
FIG. 19 is an exploded perspective view of a terminal case coupling structure.
Figure 20:
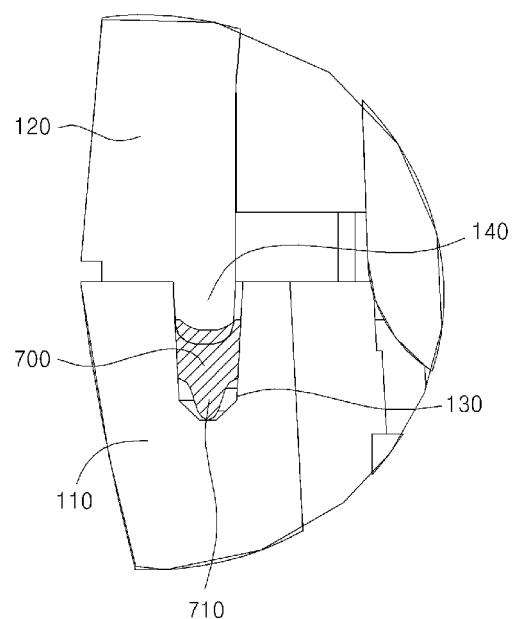
FIG. 20 is an enlarged cross-sectional view of the terminal case coupling structure of FIG. 19.
Figure 21:
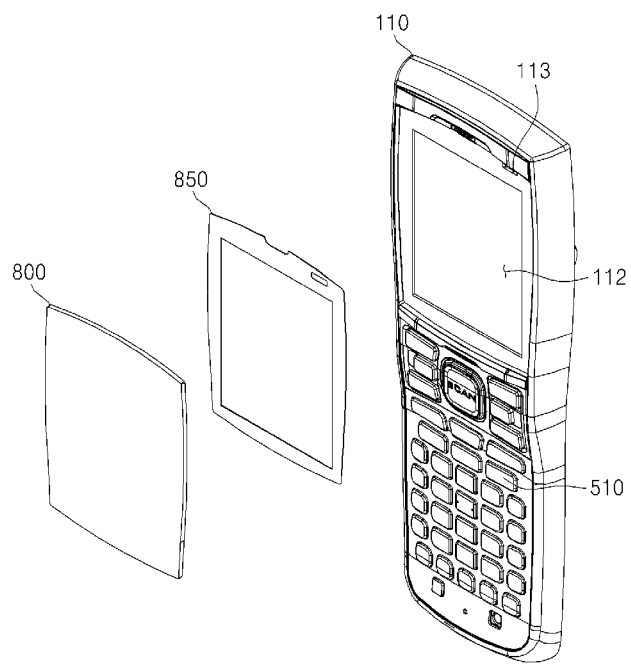
FIG. 21 is an exploded perspective view of a touch window structure.
Figure 22:
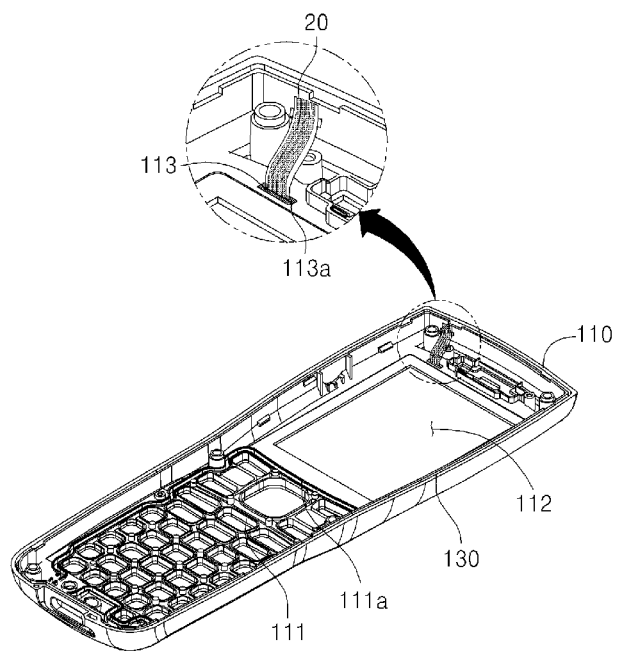
FIG. 22 is a perspective view of a flexible printed circuit board (FPCB) structure of a touch window of FIG. 21.
Figure 23:
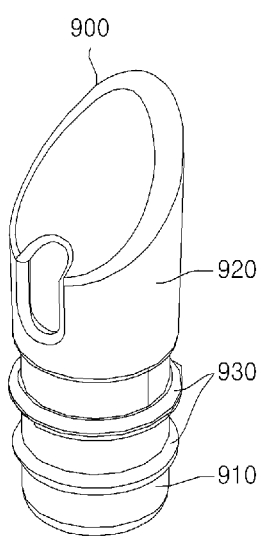
FIG. 23 is a perspective view of a screw cap.
Figure 24:
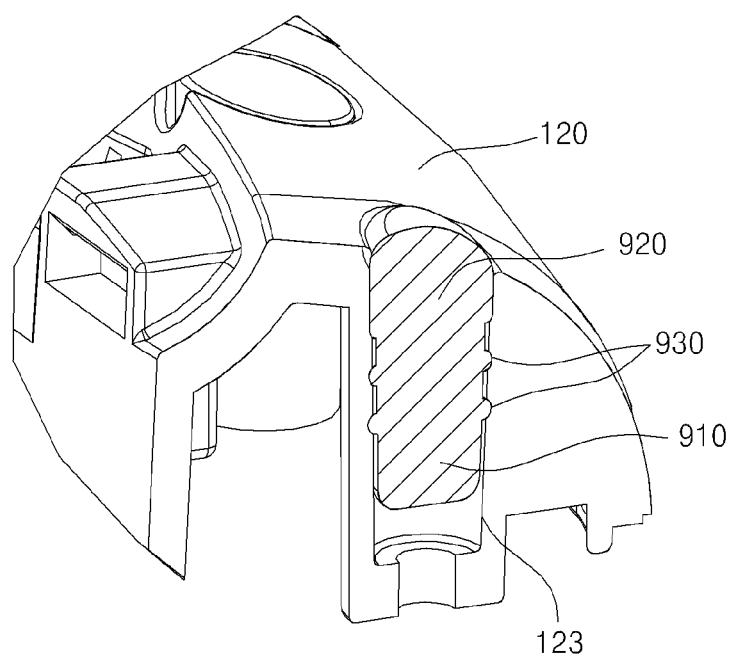
FIG. 24 is a cross-sectional view illustrating a structure of coupling of a screw cap.

FIG. 1 is a perspective view of a mobile terminal according to an embodiment of the present invention. FIG. 2 is a perspective view of a rear surface of FIG. 1. FIG. 3 is a perspective view of a trigger unit. FIG. 4 is an exploded perspective view of the trigger unit of FIG. 3. FIG. 5 is a cross-sectional perspective view of the trigger unit of FIG. 3. FIG. 6 is an enlarged cross-sectional view of a portion A of FIG. 5. FIG. 7 is a perspective view of a battery pack. FIG. 8 is an exploded perspective view of the battery pack of FIG. 7. FIG. 9 is a cross-sectional perspective view of the battery pack of FIG. 7. FIG. 10 is a front view of FIG. 9. FIG. 11 is a perspective view of a battery pack lower case. FIG. 12 is a perspective view of the battery pack lower case of FIG. 11, viewed from the opposite direction. FIG. 13 is an enlarged cross-sectional view of a portion B of FIG. 10. FIG. 14 is an enlarged cross-sectional view of a portion C of FIG. 10. FIG. 15 is a cross-sectional view of a conventional battery pack structure. FIG. 16 is an exploded perspective view of a keypad structure. FIG. 17 is a cross-sectional perspective view of the keypad structure of FIG. 16. FIG. 18 is an enlarged cross-sectional view of a portion D of FIG. 17. FIG. 19 is an exploded perspective view of a terminal case coupling structure. FIG. 20 is an enlarged cross-sectional view of the terminal case coupling structure of FIG. 19. FIG. 21 is an exploded perspective view of a touch window structure. FIG. 22 is a perspective view of a flexible printed circuit board (FPCB) structure of a touch window of FIG. 21. FIG. 23 is a perspective view of a screw cap. FIG. 24 is a cross-sectional view illustrating a structure of coupling of a screw cap.

As illustrated in these drawings, a mobile terminal 1 according to the present embodiment includes a terminal case 100 including a front surface case 110 and a rear surface case 120, which are coupled together, a trigger unit 200 provided to be exposed to the exterior of the terminal case 100 and performing user input by means of a pulling movement, a battery pack 300 coupled to the rear surface case 120 and supplying electric power to the mobile terminal, a cushion 400 interposed between the battery pack 300 and the rear surface case 120 and hermetically maintaining a coupling portion of the battery pack 30 and the rear surface case 120, a keypad silicon 500 of a flexible material coupled to a plurality of key buttons 510 and accommodated in a keypad accommodation portion 111 of the front surface case 110, a keypad bracket 600 coupled to the front surface case 110 with the keypad silicon 500 interposed between the keypad bracket 600 and the front surface case 110 and closely pressing and supporting the keypad silicon 500 to have the keypad bracket 600 closely contact the keypad silicon 500, a sealing rubber 700 of a flexible material interposed between the front surface case 110 and the rear surface case 120, a touch window 800 covering an image display portion 112 of the front surface case 110 and capable of inputting by touch, a double-sided tape 850 attached along the image display portion 112 and coupling the touch window 800 to the front surface case 110, and a screw cap 900 of a flexible material inserted into a screw insertion hole 123 and hermetically sealing the screw insertion hole 123.

Referring to FIGS. 2 to 6, the trigger unit 200 includes a trigger switch 210 exposed to the exterior of the terminal case 1 through the trigger through-hole 121 of the rear surface case 120, a trigger rubber 220 closely contacting the inside of the rear surface case 120 to cover the trigger switch 210, and a trigger bracket 230 coupled to the inside of the terminal case 1 and closely pressing and supporting the trigger rubber 220.

The trigger unit 200 is a user input portion considering convenience of a user and a user input is performed by a pulling movement of the trigger switch 210. In the present embodiment, for a user to conveniently perform a pulling movement while holding the mobile terminal, the trigger through-hole 121 is formed at a center portion of the rear surface case 120 so as to have the trigger switch 210 outwardly exposed.

Referring to FIGS. 4 and 5, the trigger switch 210 includes a pulling portion 211 partially outwardly exposed through the trigger through-hole 121 of the rear surface case 120, which is pulled by a user, a pivot portion 212 connected to the pulling portion 211 and pivotably coupled to the rear surface case 120, and a pressing portion 213 protruding from the pulling portion 211 and pressing a trigger printed circuit board (PCB) (not shown) during a pulling movement of the pulling portion 211.

The pulling portion 211 has a shape of a wide trigger and is outwardly exposed through the trigger through-hole 121 so that a user may directly contact the pulling portion 211. The pivot portion 212 is connected to a side surface of the pulling portion 211 in a cylindrical shape with a long end portion and is pivotably coupled to the inner side surface of the rear surface case 120. The pressing portion 213 protrudes at a center portion of a rear surface of the pulling portion 211 and is coupled to the trigger rubber 220.

In the trigger switch 210 configured as above, when a user pulls the pulling portion 211, the trigger switch 210 pivots around the pivot portion 212 that is pivotably coupled to the rear surface case 120 and the pressing portion 213 formed at the center portion of the rear surface of the pulling portion 211 performs a pressing movement. When the pressing portion 213 is pressed, the trigger rubber 220 coupled to the pressing portion 213 performs a pressing movement together.

Referring to FIGS. 4 to 6, the trigger rubber 220 includes a rubber main body portion 221 accommodated in an inner surface of the trigger bracket 230, a contact portion 222 coupled to the trigger switch 210 and contacting a trigger PCB by the pulling movement of the trigger switch 210, and an inclined portion 223 connecting the rubber main body portion 221 and the contact portion 222 such that the contact portion 222 is elastically biased in a direction opposite to a direction in which the contact portion 222 is pressed when the contact portion 222 is pressed.

The trigger rubber 220 is coupled to the rear surface case 120 covering the trigger switch 210 at a portion where the trigger switch 210 is coupled to the rear surface case 120. The trigger rubber 220 is formed of a flexible material and closely coupled to the rear surface case 120 to enhance waterproof performance of the trigger unit 200.

In the rubber main body portion 221, a trigger protrusion line 221a having a closed loop shape is formed along an edge of the rubber main body portion 221. The trigger protrusion line 221a is coupled to a trigger groove portion 122 formed along an edge of the trigger through-hole 121 of the rear surface case 120. As such, as the rubber main body portion 221 covers the trigger switch 210 to be coupled to the inner surface of the rear surface case 120, the waterproof performance of the trigger unit 200 is enhanced and the trigger switch 210 is supported. An end portion of the trigger protrusion line 221a is provided in a polygonal or circular shape. A part of the end portion of the trigger protrusion line 221a is formed to be larger than the width of the trigger groove portion 122. Accordingly, the trigger protrusion line 221a is forcibly inserted into the trigger groove portion 122 so as to be closely coupled to trigger groove portion 122, hermetically sealing the trigger unit 200 from the outside of the mobile terminal. FIG. 6 illustrates the above structure in detail.

The contact portion 222 is coupled to the pressing portion 213 of the trigger switch 210 and a carbon contact 222a is provided at an end portion of the contact portion 222. As the trigger switch 210 is pulled, the pressing portion 213 performs a pulling movement and thus the contact portion 222 coupled to the pressing portion 213 performs a pressing movement together. Accordingly, the contact portion 222 contacts the trigger PCB. The trigger PCB is electrically connected to a main PCB 10. A switch circuit is printed on a portion of the trigger PCB that the contact portion 222 contacts. Thus, as the carbon contact 222a of the contact portion 222 contacts the switch circuit, current flows and thus a signal is transmitted to the main PCB 10.

The inclined portion 223 connects the rubber main body portion 221 and the contact portion 222 such that, when the contact portion 222 is pressed, the contact portion 222 is elastically biased in a direction opposite to a direction in which the contact portion 222 is pressed. The inclined portion 223 has a dome shape in connecting the rubber main body portion 221 and the contact portion 222. Referring to FIG. 4, the inclined portion 223 has a dome shape in a direction in which the trigger switch 210 is coupled to the rear surface case 120. Referring to FIG. 5, the trigger rubber 220 is formed of a flexible material. Accordingly, when the contact portion 222 of the trigger rubber 220 is pressed by the pulling movement of the trigger switch 210, the inclined portion 223 is elastically pressed. When the pulling movement is removed, the contact portion 222 returns to the original state by an elastic restoration force of the inclined portion 223. Thus, a user may perform the user input by repeatedly pulling the trigger switch 210.

Referring to FIG. 5, the trigger bracket 230 includes a bracket main body portion 231 closely pressing and supporting the trigger rubber 220, a plurality of screw coupling portions 232 provided at an edge of the bracket main body portion 231 and coupled to the inside of the terminal case 100, and a contact through-hole portion 233 formed by penetrating the bracket main body portion 231 such that the trigger rubber 220 contacts the trigger PCB.

The trigger bracket 230 accommodates the trigger rubber 220 in a space for accommodating the trigger rubber 220 provided in an inner surface of the bracket main body portion 231. The trigger bracket 230 is screw coupled to the rear surface case 120 through the screw coupling portions 232 so as to closely press and support the trigger rubber 220 and the trigger switch 210. The contact through-hole 233 penetrates a plate surface of a portion of the trigger rubber 220 corresponding to the contact portion 222 and thus the contact portion 222 may contact the trigger PCB.

As the trigger unit 200 is configured as above, a coupling portion of the trigger unit 200 has a simple structure with a superior waterproof effect, which facilitates manufacture and assembly of the mobile terminal.

Referring to FIGS. 7 to 14, the mobile terminal according to the present embodiment includes the battery pack 300 coupled to the rear surface case 120 and supplying electric power to the mobile terminal, and the cushion 400 interposed between the battery pack 300 and the rear surface case 120 and hermetically maintaining a coupling portion of the battery pack 30 and the rear surface case 120.

The battery pack 300 includes a battery cell 301 and a power supply circuit and is coupled to the rear surface case 120. Referring to FIGS. 9 and 10, the battery pack 300 includes an upper case 310 having a releasable coupling portion 311 that enables a release of the battery pack 300 from the rear case 120 and a lower case 320 coupled to the upper case 310 with a part accommodation space therebetween and having a sealing line 321 formed on a lower surface thereof and pressing the cushion 400.

A coupling structure of the inside and the outside of the battery pack 300 is described below with reference to FIGS. 8 to 14.

In the internal coupling structure of the battery pack 300, a battery groove portion 322 having a closed loop shape is formed along an edge of a portion of the lower case 320 to be coupled with the upper case 310. The cross-section of the battery groove portion 322 has a "U" shape. The upper case 310 is provided with a battery protrusion portion 312 corresponding to the battery groove portion 322. A welding thread 312a is formed at an end portion of the battery protrusion portion 312. The upper case 310 and the lower case 320 are coupled to each other by forcibly inserting the battery protrusion portion 312 into the battery groove portion 322. The welding thread 312a is melted by an ultrasonic welding method so as to firmly couple the upper case 310 and the lower case 320 to each other.

Referring to FIG. 14, as the cross-section of the battery groove portion 322 has a "U" shape, an effect of preventing intrusion of moisture or foreign materials in a triple way may be obtained. Conventionally, since the cross-section of a lower case has a "L" shape, intrusion of moisture or foreign materials may not be effectively prevented.

Next, in the external coupling structure of the battery pack 300, the battery pack 300 is accommodated in the rear surface case 120 and is coupled to the rear surface case 120 by means of the releasable coupling portion 311. The cushion 400 is interposed in a space where the battery pack 300 is accommodated in the rear surface case 120. In the present embodiment, the cushion 400 is formed of polyolefin foam having a superior compression performance. The sealing line 321 having a closed loop shape is formed along the edge of the lower case 320 that contacts the cushion 400. The sealing line 321 presses the cushion 400 when the battery pack 300 is accommodated in the rear surface case 120, thereby preventing the intrusion of external foreign materials or moisture by hermetically sealing the coupling portion of the battery pack 300 and the rear surface case 120.

As such, the above structure of the battery pack 300 may prevent the intrusion of moisture by the coupling structure of the inside and outside of the battery pack 300 and facilitate manufacture and assembly of the mobile terminal.

Referring to FIGS. 16 to 18, the mobile terminal according to the present embodiment includes the keypad silicon 500 of a flexible material coupled to the key buttons 510 and accommodated in the keypad accommodation portion 111 of the front surface case 110, and the keypad bracket 600 coupled to the front surface case 110 with the keypad silicon 500 interposed therebetween and closely pressing and supporting the keypad silicon 500.

The keypad silicon 500 is coupled to the key buttons 510 for inputting signals by a user's pressing movement. The key buttons 510 are coupled to the keypad accommodation portion 111 by penetrating the front surface case 110 to be outwardly exposed. Referring to FIGS. 16 to 18, in the coupling structure of the keypad silicon 500, a keypad groove portion 111a having a closed loop shape is continuously formed along an edge of the keypad accommodation unit 111 of the front surface case 110. A keypad protrusion portion 520 having a closed loop shape is formed along an edge of the keypad silicon 500 corresponding to the keypad groove portion 111a. Accordingly, the keypad protrusion portion 520 is forcibly inserted into the keypad groove portion 111a.

The keypad silicon 500 is formed of a flexible material, that is, silicon in the present embodiment. The keypad silicon 500 is provided with a plurality of button coupling portions 530 to which the key buttons 510 are coupled. The keypad silicon 500 is integrally molded so as to have no crack in a surface thereof. An end portion of the keypad protrusion portion 520 of the keypad silicon 500 has a polygonal or circular shape. A part of the end portion of the keypad protrusion portion 520 is provided to have a width larger than that of the keypad groove pad 111a so that, when the keypad protrusion portion 520 is coupled to the keypad groove portion 111a, the keypad protrusion portion 520 is tightly coupled to the keypad groove portion with a close contact thereto. Accordingly, the intrusion of moisture between the keypad silicon 500 and the front surface case 110 is prevented (refer to FIG. 18). Also, since the keypad silicon 500 is integrally molded, the intrusion of moisture through a space between the key buttons 510 and the front surface case 110 may be prevented.

The keypad bracket 600 is screw coupled to the front surface case 110 with the keypad silicon 500 interposed therebetween and closely presses and supports the keypad silicon 500. Also, as the rear surface case 120 is coupled to the front surface case 110, the keypad bracket 600 is closely pressed by the main PCB 10 and thus the keypad silicon 500 may be more firmly supported.

The keypad silicon 500 and the keypad bracket 600 configured as above each have a simple structure, are easily assembled, and exhibit superior waterproof performance.

Referring to FIGS. 19 and 20, the mobile terminal of the present embodiment includes a sealing rubber 700 of a flexible material interposed between the front surface case 110 and the rear surface case 120.

In the coupling structure of a mobile case, a case groove portion 130 having a closed loop shape is formed along an edge of the front surface case 110 so that the sealing rubber 700 is coupled thereto. A case protrusion portion 140 having a closed loop shape is continuously formed along an edge of the rear surface case 120. Accordingly, the case protrusion portion 140 is coupled to the case groove portion 130 while pressing the sealing rubber 700.

The sealing rubber 700 is coupled to the case groove portion 130 and a protruding thread 710 having a closed loop shape is formed corresponding to the case groove portion 130 at an end portion of the sealing rubber 700 in a direction to face the case groove portion 130. As the rear surface case 120 is coupled to the case groove portion 130 to which the sealing rubber 700 is coupled, the case protrusion portion 140 presses the sealing rubber 700. Then, as illustrated in FIG. 20, the protruding thread 710 is compressed expanding in a widthwise direction of the case groove portion 130, thereby firmly sealing the case groove portion 130.

The structure of the sealing rubber 700 configured as above may simply and easily couple the front surface case 110 and the rear surface case 120 and prevent intrusion of moisture.

Referring to FIG. 21, the mobile terminal according to the present embodiment includes a touch window 800 covering the image display portion 112 of the front surface case 110 and capable of touch input, and the double-side tape 850 attached along an edge of image display portion 112 and coupling the touch window 800 to the front surface case 110.

The touch window 800 includes a touch panel being capable of touch input. A touch panel of a capacitive type or a resistive type may be used as the touch panel. The touch window 800 covers the image display portion 112 such that a user can make a touch input through the image display portion 112 and is attached to the front surface case 110 by using the double-sided tape 850 that is attached to the edge of the image display portion 112. A tape that is formed of a material exhibiting superior adhesion and waterproof features is used as the double-sided tape 850.

A through-hole 113, through which a flexible printed circuit board (FPCB) 20 connecting the touch window 800 and the main PCB 10 passes, is formed in a portion of the edge of the image display portion 112. The through-hole 113 is provided with a sealing member 113a. The touch panel included in the touch window 800 is provided with the FPCB 20 that receives a touch signal and transfers the received signal to the main PCB 10. The FPCB 20 is electrically connected to the main PCB 10 through the through-hole 113 of the front surface case 110. Referring to FIG. 22, the through-hole 113 through which the FPCB 20 passes is sealed with waterproof silicon, thereby preventing intrusion of foreign materials or moisture. Although waterproof silicon is used in the present embodiment, other waterproof members may be used instead.

The above coupling structure of the touch window 800 may facilitate assembly and manufacture of the mobile terminal and also provide superior waterproof performance.

Referring to FIGS. 2, 23, and 24, the mobile terminal according to the present embodiment includes a screw cap 900 formed of a flexible material and inserted into the screw insertion hole 123 of the rear surface case 120 to seal the screw insertion hole 123.

The screw insertion hole 123 that is screw coupled to the front surface case 110 is provided in plural positions in the rear surface case 120. A plurality of screw coupling holes 114 of FIG. 19 are provided at positions corresponding to the screw insertion holes 123 in an inner surface of the front surface case 110. Accordingly, when the rear surface case 120 and the front surface case 110 are coupled to each other, screws not shown are inserted into the screw insertion holes 123 so as to be screw coupled to the screw coupling holes 114.

The screw cap 900 includes a cap main body portion 910 having a cylindrical column shape, the diameter of a cross-section of which is smaller than the diameter of the screw insertion hole 123, a cap header portion 920 provided at an end portion opposite to a direction in which the cap main body portion 910 is inserted into the screw insertion hole 123 and forcibly inserted into the screw insertion hole 123, and at least one cap O-ring portion 930 having an O-ring shape, protruding in a radial direction of the cap main body portion 910, and forcibly inserted into the screw insertion hole 123.

The screw cap 900 is coupled to the screw insertion hole 123 to prevent intrusion of foreign materials or moisture into the inside of the mobile terminal through a gap between the screw insertion hole 123 and a screw coupled to the screw insertion hole 123. Even when the cap O-ring portion 930 of the screw cap 900 is provided to have a diameter greater than the diameter of the screw insertion hole 123, since the diameter of an adjacent portion to the cap O-ring portion 930 is smaller than the diameter of the screw insertion hole 123, the cap O-ring portion 930 works as an allowance when the screw cap 900 is coupled to the screw insertion hole 123 and thus the screw cap 900 may be easily coupled to the screw insertion hole 123. Also, since the screw cap 900 is formed of a flexible material, the cap O-ring portion 930 and the cap header portion 920 having diameters greater than that of the screw insertion hole 123 may be easily forcibly insertion into the screw insertion hole 123.

As such, the screw insertion hole 123 may be easily sealed by the screw cap 900 so that the intrusion of foreign materials or moisture may be prevented.

As described above, according to the mobile terminal according to the present invention, the respective coupling structures of the mobile terminal may be simply ad easily manufactured and assembled. Also, intrusion of foreign materials or moisture may be effectively prevented.

While this invention has been particularly shown and described with reference to exemplary embodiments thereof, it will be understood by those skilled in the art that various changes in form and details may be made therein without departing from the spirit and scope of the invention as defined by the appended claims.

INDUSTRIAL APPLICABILITY

The present invention may be used for mobile terminals such as mobile communication terminals such as cellular phones, personal digital assistants (PDAs), etc.

The invention claimed is:

1. A mobile terminal comprising:
a terminal case including a front surface case and a rear surface case which are coupled together; and
a trigger unit for performing user input by means of a pulling movement,
wherein the trigger unit comprises:
a trigger switch, wherein a first portion of the trigger switch is exposed to the exterior of the terminal case and wherein a second portion of the trigger switch is not exposed to the exterior of the terminal case;
a trigger rubber inside, and in close contact with, the terminal case so as to cover the second portion of the trigger switch; and
a trigger bracket inside, and coupled to, the terminal case, wherein the trigger bracket supports the trigger rubber by means of pressure.

2. The mobile terminal of claim 1, wherein the first portion of the trigger switch is outwardly exposed through a trigger through-hole of the rear surface case.

3. The mobile terminal of claim 1, wherein the trigger switch comprises:
a pulling portion partially outwardly exposed through the terminal case and performing a pulling movement by a user;
a pivot portion connected to the pulling portion and pivotably coupled to the terminal case; and
a pressing portion protruding from the pulling portion and pressing a trigger printed circuit board (PCB) during the pulling movement of the pulling portion.

4. The mobile terminal of claim 1, wherein the trigger rubber is formed of an elastic material.

5. The mobile terminal of claim 4, wherein the trigger rubber comprises:
a rubber main body portion accommodated in an inner surface of the trigger bracket;
a contact portion coupled to the trigger switch and contacting a trigger printed circuit board (PCB) by the pulling movement of the trigger switch; and
an inclined portion connecting the rubber main body portion and the contact portion such that the contact portion is elastically biased in a direction opposite to a direction in which the contact portion is pressed when the contact portion is pressed.

6. The mobile terminal of claim 5, wherein a trigger protrusion line having a closed loop shape is formed along an edge of the rubber main body portion and is coupled to a trigger groove portion formed in an inner surface of the rear surface case.

7. The mobile terminal of claim 6, wherein an end portion of the trigger protrusion line is provided in a polygonal or circular shape and a part of the end portion of the trigger protrusion line is formed to be larger than the width of the trigger groove portion.

8. The mobile terminal of claim 5, wherein a carbon contact is provided at an end portion of the contact portion.

9. The mobile terminal of claim 5, wherein the inclined portion has a dome shape in connecting the rubber main body portion and the contact portion.

10. The mobile terminal of claim 1, wherein the trigger bracket comprises:
a bracket main body portion closely pressing and supporting the trigger rubber;
a plurality of screw coupling portions provided at an edge of the bracket main body portion and coupled to the inside of the terminal case; and
a contact through-hole portion formed by penetrating the bracket main body portion such that the trigger rubber contacts a trigger printed circuit board (PCB).

11. The mobile terminal of claim 1, further comprising:
a battery pack for supplying electric power to the mobile terminal; and
a cushion interposed between the battery pack and the rear surface case and hermetically maintaining a coupling portion of the battery pack and the rear surface case.

12. The mobile terminal of claim 11, wherein the battery pack comprises:
an upper case having a releasable coupling portion that enables a release of the battery pack from the rear case; and
a lower case coupled to the upper case with a part accommodation space between the lower case and the upper case and having a sealing line formed on a lower surface of the lower case and pressing the cushion.

13. The mobile terminal of claim 12, wherein a battery groove portion having a closed loop shape is formed along an edge of a portion of the lower case to be coupled with the upper case and the cross-section of the battery groove portion has a "U" shape.

14. The mobile terminal of claim 13, wherein a battery protrusion portion is provided in the upper case corresponding to the battery groove portion and a welding thread is formed in an end portion of the battery protrusion portion.

15. The mobile terminal of claim 14, wherein the upper case and the lower case are forcibly insertion coupled with each other and the welding thread couples the upper case and the lower case to each other by an ultrasonic welding method.

16. The mobile terminal of claim 11, wherein the cushion is formed of polyolefin foam.

17. The mobile terminal of claim 1, further comprising:
a keypad silicon of a flexible material coupled to a plurality of key buttons and accommodated in a keypad accommodation portion of the front surface case; and
a keypad bracket coupled to the front surface case with the keypad silicon interposed between the keypad bracket and the front surface case and closely pressing and supporting the keypad silicon.

18. The mobile terminal of claim 17, wherein a keypad groove portion having a closed loop shape is formed along an edge of the keypad accommodation portion and a keypad protrusion portion having a closed loop shape is formed along an edge of the keypad silicon corresponding to the keypad groove portion.

19. The mobile terminal of claim 18, wherein an end portion of the keypad protrusion portion has a polygonal or circular shape and a part of the end portion of the keypad protrusion portion is formed to be larger than the width of the keypad groove portion.

20. The mobile terminal of claim 17, wherein the keypad silicon comprises a plurality of button coupling portions to which the plurality of key buttons are coupled and the keypad silicon is integrally molded so as to have no crack in a surface thereof.

21. The mobile terminal of claim 1, further comprising a sealing rubber that is formed of a flexible material and interposed between the front surface case and the rear surface case,
wherein a case groove portion having a closed loop shape, to which the sealing rubber is coupled, is provided along an edge of any one of the front surface case and the rear surface case, and a case protrusion portion for pressing the sealing rubber is provided on any one of the front surface case and the rear surface case.

22. The mobile terminal of claim 21, wherein a protrusion thread having a closed loop shape is formed corresponding to the case groove portion at one end portion of the sealing rubber in a direction to be coupled to the case groove portion.

23. The mobile terminal of claim 1, further comprising:
a touch window covering an image display portion of the front surface case and capable of touch input; and
a double-sided tape attached along an edge of the image display portion and coupling the touch window to the front surface case.

24. The mobile terminal of claim 23, wherein a through-hole, through which a flexible printed circuit board (FPCB) that connects the touch window and a main printed circuit board (PCB) passes, is formed at a portion of the edge of the image display portion, and a sealing member is provided in the through-hole.

25. The mobile terminal of claim 1, wherein a plurality of screw insertion holes that are screw coupled to the front surface case are provided in the rear surface case, the mobile terminal further comprising a screw cap that is formed of a flexible material, is inserted into each of the plurality of screw insertion holes, and seals the plurality of screw insertion holes.

26. The mobile terminal of claim 25, wherein the screw cap comprises:
a cap main body portion having a cylindrical column shape, a diameter of cross-section of which is smaller than the diameter of the screw insertion hole;
a cap header portion provided at an end portion opposite to a direction in which the cap main body portion is inserted into the screw insertion hole and forcibly inserted into the screw insertion hole; and
at least one cap O-ring portion having an O-ring shape, which protrudes in a radial direction of the cap main body portion and is forcibly inserted into the screw insertion hole.

\* \* \* \* \*